L. A. CARPENTER & R. MIDDLETON.
PIPE HANGER.
APPLICATION FILED APR. 26, 1912.
1,158,633.
Patented Nov. 2, 1915.
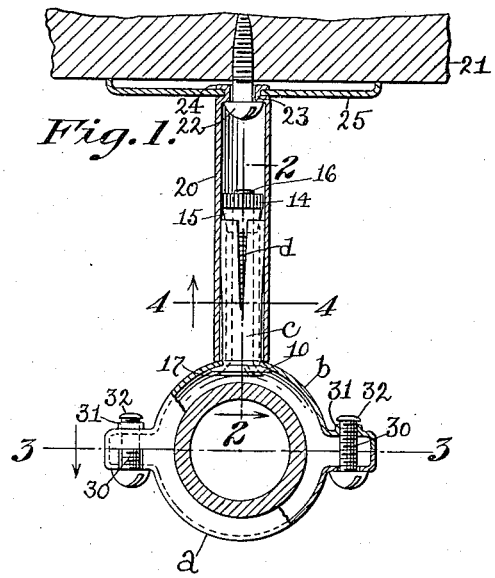
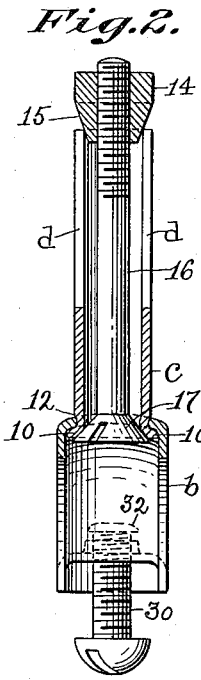
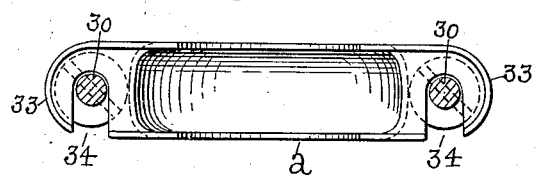
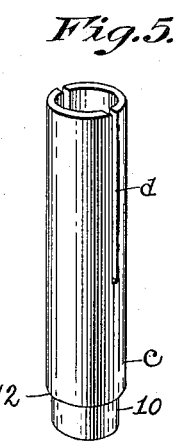
Witnesses:
M. G. Crozier
J. Murphy
Inventors.
Lewis A. Carpenter
Richard Middleton
by Jas. H. Churchill
atty.

UNITED STATES PATENT OFFICE.

LEWIS A. CARPENTER AND RICHARD MIDDLETON, OF REVERE, MASSACHUSETTS.

PIPE-HANGER.

1,158,633.  Specification of Letters Patent.  Patented Nov. 2, 1915.

Application filed April 26, 1912. Serial No. 693,305.

*To all whom it may concern:*

Be it known that we, LEWIS A. CARPENTER and RICHARD MIDDLETON, citizens of the United States, and both residing in Revere, county of Suffolk, and State of Massachusetts, have invented an Improvement in Pipe-Hangers, of which the following description, in connection with the accompanying drawings, is a specification, like letters on the drawings representing like parts.

This invention relates to a pipe hanger and has for its object to provide a simple and efficient hanger capable of being quickly and easily adjusted to adapt it to pipes which are to be supported at different distances from the ceiling, wall or other support. To this end, the hanger is provided with pipe engaging members, and one of said members carries a clutching device by means of which the pipe engaging member may be clutched or secured to a supporting member.

The clutching device may and preferably will be made as a tube or sleeve split at one end and capable of being inserted into a hollow stem or tube constituting a supporting member, and of being expanded therein by means of a tapered nut movable on a threaded rod, as will be described. Provision is also made for enabling the pipe engaging members to be secured together with the least possible trouble on the part of the operator. These and other features of this invention will be pointed out in the claims at the end of this specification.

Figure 1 is an elevation and section of a pipe hanger embodying this invention. Fig. 2, an enlarged view in section of one of the pipe engaging members and the clutching device shown in Fig. 1. Fig. 3, a detail of the coöperating pipe engaging member. Fig. 4, a section on the line 4, 4, Fig. 1, and Fig. 5, a detail to be referred to.

Referring to the drawing $a$, $b$, represents two pipe engaging members, preferably of sheet metal and of the construction herein shown. The member $b$ has secured to it substantially at its longitudinal center, a metal sleeve or tube $c$ provided at its free end with one and preferably with a plurality of slits $d$ extended but partially the length of the same. The unsplit end of the sleeve $c$ is secured to the pipe engaging member $b$, which may be accomplished in any suitable manner, but preferably as herein shown, by providing the sleeve with a reduced end portion 10, see Fig. 5, which is extended through an opening in the member $b$ and is expanded to engage the said member on its inner side, see Fig. 2, and firmly clamp or lock said member against a shoulder 12 formed on the sleeve $c$ by the reduced portion 10.

The split end of the tube has coöperating with it an expanding device, herein shown as a nut 14 having an externally tapered surface 15, which engages the inner surface of the split end of the sleeve or tube $c$, said nut being mounted on a threaded rod 16 having a head 17, herein shown as a screw head, which is capable of being turned by a screw driver. By holding the member $b$ in one hand, the operator can turn the threaded rod 16 by means of the screw driver or other tool, so as to cause the nut 14 to travel longitudinally on the threaded rod in opposite directions. The sleeve $c$ is inserted into a hollow supporting member or tube 20, which is designed to be fastened to the ceiling, wall, or other support 21 by a screw 22, having its head in engagement with the walls 23 of an opening formed by reducing the diameter of the tube 20 at one end. The tube 20 may and preferably will be secured to a suitable base plate 25, which is effected as shown in Fig. 1 by extending the reduced end 24 of the tube $c$ through a hole in the plate 25 and expanding the projecting end of said reduced portion.

The split tube $c$ in its contracted condition is capable of being readily slipped into and moved longitudinally in the hollow stem or tube 20, so as to position or adjust the pipe engaging member $b$ with relation to the support 21, and when the member $b$ is properly adjusted or positioned, it may be firmly secured in such position by the plunger or other operator turning the threaded rod 16, so as to move the tapered nut 14 into the split end of the sleeve $c$ and expand the split end of the same into firm engagement with the hollow stem or tube 20 and thereby clutch the member $b$ thereto.

The pipe engaging members $a$, $b$ may and preferably will be made of sheet metal, and provision is made for reducing to a minimum the troubles and labor of the plumber in securing the member *a* to the member *b*. For this purpose, the member *b* carries screws 30, which are in threaded engagement with nipples 31, formed by elongating the walls of the openings through which the screws are passed and providing said walls with screw threads, and said screws are and preferably will be enlarged or provided with flanges 32 at their upper ends, so as to permanently secure the screws to the member *b*, whereby the ears 33 of the member *a* may be provided with slots 34, which are open at their ends, so that the member *a* is capable of being moved sidewise so as to enter the screws 30 in the slots 34, after which the member *a* can be released by the plumber and allowed to rest upon the head of the screws 30, thereby leaving both hands of the plumber free to turn up the screws so as to fasten the member *a* to the member *b*. The split tube *c*, the tapered nut 14 and the threaded rod 16 for moving said nut, constitute one form of clutching device by which the pipe engaging member *b* may be adjustably secured to the supporting member 20, and while this construction of clutching device may be preferred, it is not desired to limit the invention to the particular construction herein shown.

The hanger is capable of a substantially wide range of adjustment which may be increased by cutting off the tube 20 at its outer end, so as to permit the clutching device to be brought close to the base plate 25.

Claims:

1. In a pipe hanger, in combination, a sheet metal pipe-engaging member having a substantially central opening, a metal sleeve having a reduced end portion extended through the said opening into the pipe-engaging member and expanded within the latter to lock the said sleeve to the pipe-engaging member, said tube being slitted at its free end, a tapered nut coöperating with the split end of said sleeve, a threaded rod extended from within the pipe-engaging member into said sleeve to engage said nut and having a head within the pipe-engaging member bearing against the expanded end of the sleeve within the pipe-engaging member, and a hollow stem into which the split sleeve is inserted and expanded into contact therewith, said hollow stem having an internal shoulder at its rear end, for the purpose specified.

2. In a pipe hanger, in combination, a pipe-engaging member provided with a substantially central opening, a metal sleeve extended outwardly from said member in line with said opening and slitted at its free end, means to secure the said sleeve to the pipe-engaging member to be handled as one piece, a rod provided with a head at one end and with screw-threads at its opposite end, said rod being extended from within the pipe-engaging member into the split sleeve and having its head within the pipe-engaging member, a tapered nut engaging the threaded end of said rod and the split end of said sleeve, a hollow stem into which the split sleeve is inserted, and means to secure said hollow stem in fixed position with relation to the pipe to be supported, substantially as described.

In testimony whereof, we have signed our names to this specification in the presence of two subscribing witnesses.

LEWIS A. CARPENTER.
RICHARD MIDDLETON.

Witnesses:
JAS. H. CHURCHILL,
J. MURPHY.

Copies of this patent may be obtained for five cents each, by addressing the "Commissioner of Patents, Washington, D. C."